US005466069A

United States Patent [19]
Agari

[11] Patent Number: 5,466,069
[45] Date of Patent: Nov. 14, 1995

[54] LINEAR MOTION GUIDE UNIT WITH END RECESSED RETAINER

[75] Inventor: Norimasa Agari, Seki, Japan

[73] Assignee: Nippon Thompson Co., Ltd., Tokyo, Japan

[21] Appl. No.: 336,626

[22] Filed: Nov. 9, 1994

Related U.S. Application Data

[62] Division of Ser. No. 41,917, Apr. 2, 1993, Pat. No. 5,384,202, which is a continuation of Ser. No. 815,019, Dec. 26, 1991, abandoned.

[30] Foreign Application Priority Data

Dec. 28, 1990 [JP] Japan .................. 2-405624 U

[51] Int. Cl.$^6$ ................................. F16C 29/02
[52] U.S. Cl. .............................. 384/49; 384/51
[58] Field of Search .................. 384/18–22, 49, 384/50, 51; 312/334.9, 334.36

[56] References Cited

U.S. PATENT DOCUMENTS

| | | | |
|---|---|---|---|
| 1,650,854 | 11/1927 | Rouanet | 428/596 |
| 3,019,866 | 2/1962 | Grabowski | 428/596 |
| 3,738,716 | 6/1973 | Lambert | 384/18 |
| 4,655,613 | 4/1987 | Yokota | 384/49 |
| 4,701,058 | 10/1987 | Mottate | 384/49 X |

*Primary Examiner*—Thomas R. Hannon
*Attorney, Agent, or Firm*—Skjerven, Morrill, MacPherson, Franklin, & Friel

[57] ABSTRACT

An elongated retainer for use in a linear motion guide unit is provided. The retainer has a generally U-shaped cross sectional shape and formed with a recessed portion at each end thereof. The recessed portion is engageable with a corresponding stopper provided at each end of the guide unit so that the effective stroke of the retainer is increased by a sum of the depths of these two recessed portions.

4 Claims, 2 Drawing Sheets

LINEAR MOTION GUIDE UNIT WITH END RECESSED RETAINER

This application is a division of application Ser. No. 08/041,917, filed Apr. 2, 1993, U.S. Pat. No. 5,384,202 which is a file-wrapper continuation of Ser. No. 07/815,019, filed Dec. 26, 1991, now abandoned.

BACKGROUND OF THE INVENTION

1. Field of the Invention

This invention generally relates to a linear motion guide unit and in particular to a retainer for use in such a linear motion guide unit which is particularly suitable for use as a guide unit of a magnetic head assembly in various measuring apparatuses and computer related apparatuses.

2. Description of the Prior Art

A linear motion guide unit is well known and it typically includes an elongated rail, a slider slidably mounted on the rail, a plurality of rolling members interposed between the rail and the slider and a retainer also interposed between the rail and the slider for retaining the rolling members in position during a relative sliding motion between the rail and the slider. Such a linear motion guide unit may be used in various applications, and a compact and light-weight linear motion guide unit particularly suitable for use as a guide unit in a magnetic head assembly in a computer related apparatus is disclosed in the Japanese Utility Model Post-examination Publication No. 62-35943 and schematically shown in FIG. 4 here.

As shown in FIG. 4, such a linear motion guide unit generally includes an elongated rail, a table or slider A slidably mounted on the rail, a plurality of rolling members or balls in the illustrated example interposed between the rail and the slider A, and a retainer C for retaining the balls in position. In such a structure, in order to prevent the retainer C from slipping away from each end of the slider A or the rail, a stopper B is typically fixedly attached to the slider A at each end thereof. Thus, the retainer C is prevented from slipping away since its each end surface D comes into contact with an associated stopper B at its extreme end of the stroke, so that the retainer C may be always kept in a space defined between the rail and the slider A so as to keep the balls in position.

Because of the provision of such stoppers B at both ends of the slider A, the stroke of the table A relative to the rail is shortened by twice the width of the stopper B since the stopper B is provided on both ends of the slider A. Put it another way, the effective stroke distance becomes shorter as compared with the actual length of the slider A and thus there is a limit in reducing the overall size of the entire assembly.

SUMMARY OF THE INVENTION

In accordance with the present invention, there is provided an improved retainer for use in a linear motion guide unit. Typically, a linear motion guide unit includes an elongated rail, a slider, a plurality of rolling members interposed between the rail and the slider and a retainer for retaining the rolling members in position. The present invention is concerned with such a retainer for use in a linear motion guide unit, and, in particular, with a novel structure of such a retainer.

In accordance with a preferred embodiment of the present invention, there is provided a retainer which is generally elongated in shape and having a shape which allows to be located in a gap between the rail and the slider for retaining the rolling members in position. The slider or the rail is provided with a pair of stoppers for limiting the movement of the retainer in the longitudinal direction so as to prevent the retainer from slipping away from the present unit. The retainer is formed with a recessed portion at each end therefor for receiving therein a corresponding one of the stoppers at least partly when the retainer is located at its corresponding limit location so as to increase an effective stroke of the retainer relative to the slider or rail.

In another embodiment of the present invention, a retainer has a horizontal section and a pair of vertical sections extending vertically from the opposite sides of the horizontal section, thereby defining a generally U-shaped cross section. The horizontal section of the retainer is formed with a recessed portion at each end thereof. As a further modification, the horizontal section of the retainer is formed with at least one window. Preferably, the shape of each of the recessed portions of the retainer is identical to that of a part of the window. In this case, an elongated stock member having a generally U-shaped cross section and formed with a plurality of windows of a predetermined shape, same or different in size, spaced apart and arranged along the longitudinal axis is prepared and such a stock member is cut transversely to provide a retainer having a desired length and having a structure of the present invention.

It is therefore a primary object of the present invention to obviate the disadvantages of the prior art and to provide an improved retainer for use in a linear motion guide unit.

Another object of the present invention is to provide an improved retainer having an increased effective stroke.

A further object of the present invention is to provide an improved retainer which allows to make a linear motion guide unit more compact in size.

A still further object of the present invention is to provide an improved linear motion guide unit compact in size and light in weight.

A still further object of the present invention is to provide an improved linear motion guide unit easy to manufacture and thus low at cost.

Other objects, advantages and novel features of the present invention will become apparent from the following detailed description of the invention when considered in conjunction with the accompanying drawings.

DESCRIPTION OF THE PREFERRED EMBODIMENTS

Figure 1:
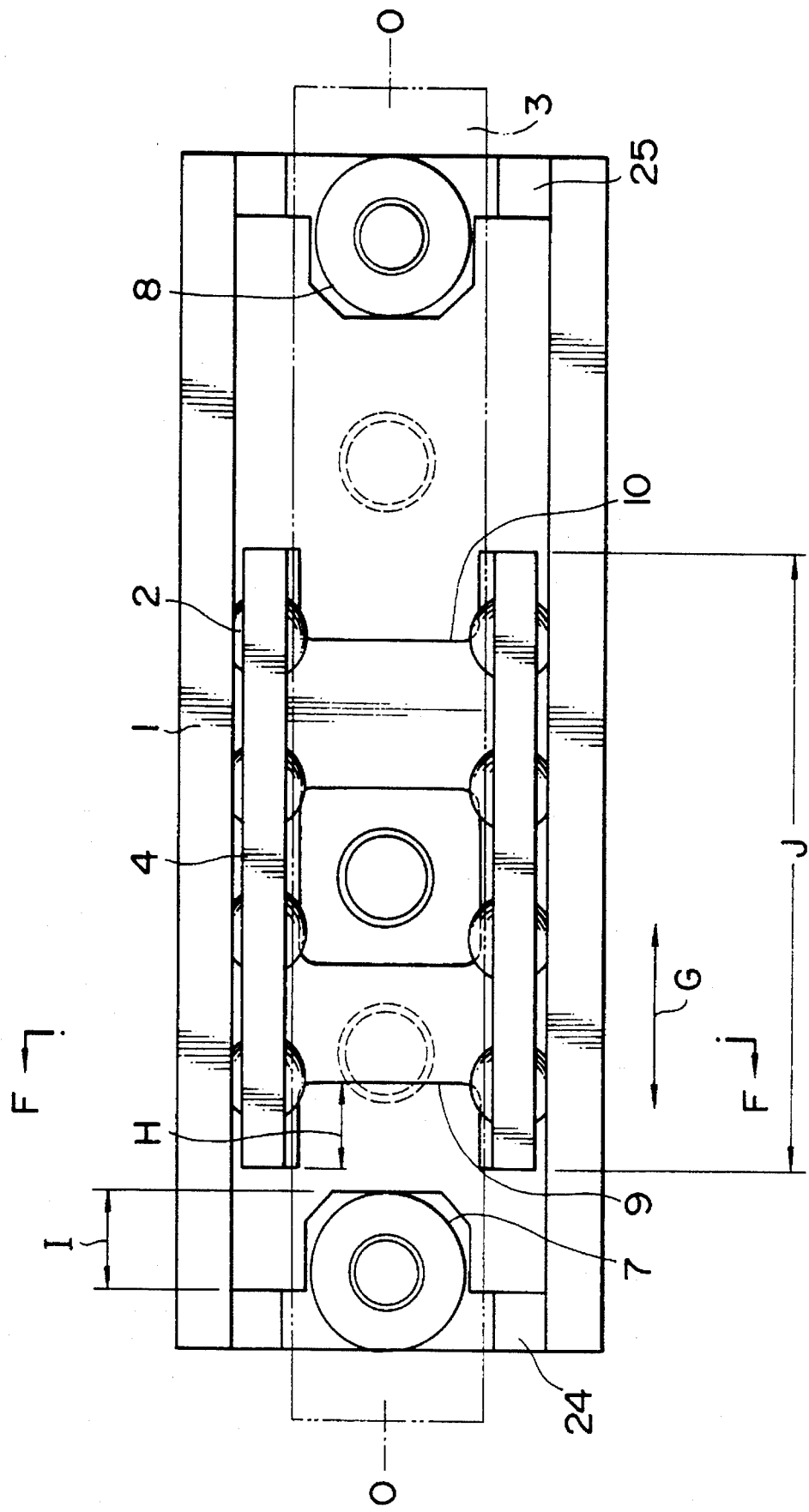
FIG. 1 is a schematic illustration showing in bottom view a linear motion guide unit constructed in accordance with one embodiment of the present invention with its rail indicated by a phantom line.
Figure 2:
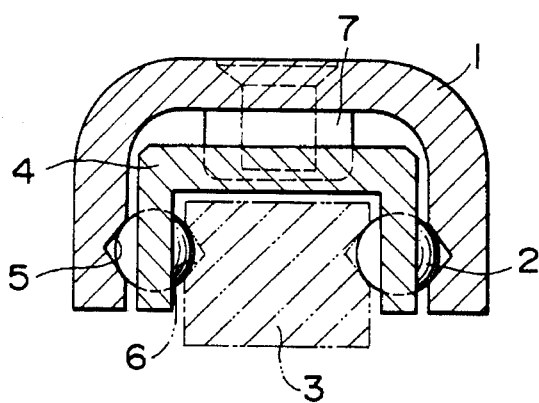
FIG. 2 is a schematic illustration showing in transverse cross section taken along line 2—2 indicated in FIG. 1.

Referring now to FIGS. 1 and 2, there is schematically shown a linear motion guide unit constructed in accordance with one embodiment of the present invention. As shown, the present linear motion guide unit generally includes an elongated rail 3, a slider 1, a plurality of balls 2 as rolling members interposed between the rail 3 and the slider 1 and a retainer 4 also located between the rail 3 and the slider 1 for retaining the balls 2 in position between the rail 3 and the slider 1.

In the illustrated embodiment, the rail 3 is generally rectangular in cross section. However, the rail 3 may have any other desired cross section depending on applications. The rail 3 is elongated in shape and has a pair of side surfaces each of which is formed with an inner guide groove 6 extending straight in parallel with the longitudinal axis of the rail 3. The slider 1, on the other hand, has a generally U-shaped cross section and thus it has a horizontal section, which is generally flat, and a pair of vertical sections which extend vertically from the opposite sides of the horizontal section. As best shown in FIG. 2, each of the vertical sections has an inner surface which is formed with an outer guide groove 5 opposite to a corresponding one of the inner guide grooves 6 to thereby define a guide channel therebetween.

The balls 2 are provided in each of these guide channels as partly received in each of the associated inner and outer guide grooves 6 and 5 so that a rolling contact is provided between the rail 3 and the slider 1 via these balls 2. Thus, the slider 1 may be moved relative to the rail 3 in either direction as indicated by the double arrow G. The retainer 4 of the present embodiment also has a generally U-shaped cross section and thus a horizontal section and a pair of vertical sections extending vertically from the opposite sides of the horizonal section. The retainer 4 is disposed in a space defined between the rail 3 and the slider 1. In the illustrated embodiment, each of the vertical sections of the retainer 4 is formed with a plurality of holes 23 spaced apart from one another and arranged in a direction in parallel with the longitudinal axis of the retainer. Each of these holes 23 partly receives therein a corresponding ball 2 for proper positioning thereof. As a result, the balls 2 may be located properly in position in the guide channels at all times by means of this retainer 4.

In the illustrated embodiment, the slider 1 is also provided with a stopper 7, 8 at each end thereof. As shown in FIG. 2, in this embodiment, the stopper 7, 8 is fixedly attached to the slider 1 as extending downward over a predetermined distance so as to be able to come into engagement with a corresponding end of the retainer 4. Thus, the retainer 4 comes into contact or engagement with a corresponding stopper 7, 8 when the retainer 4 moves to its one of the two limit locations in the guide unit so as to prevent the retainer 4 and thus the balls 2 retained by the retainer 4 from slipping away from the present guide unit.

Of importance, in accordance with this embodiment, as best shown in FIG. 1, a recessed portion 9, 10 is formed at each end of the horizontal section of the retainer 4. In the illustrated embodiment, the recessed portion 9, 10 is wide enough to partly receive therein a corresponding stopper 7, 8 and has a depth H which is slightly smaller than a length I of the stopper 7, 8 in the longitudinal axis O—O of the slider 1. Although the recessed portion 9, 10 is formed in the horizontal section of the retainer 4, such a recessed portion may be formed in one of both of the vertical sections of the retainer 4, if desired. In addition, the stopper 7, 8 is mounted on the horizontal section of the slider 1, such a stopper may be mounted on one or both of the vertical sections of the slider 1, if desired, and, alternatively, such a stopper may be mounted on the rail 3 rather than the slider 1, if desired.

Figure 3:
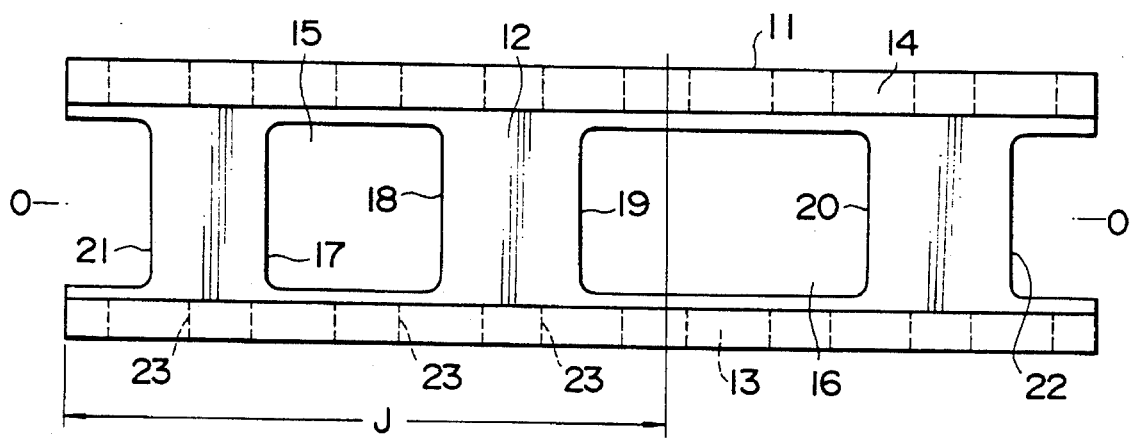
FIG. 3 is a schematic illustration showing in bottom view a stock retainer which is to be cut to a desired length to provide a retainer for use in a linear motion guide unit.
Figure 4:
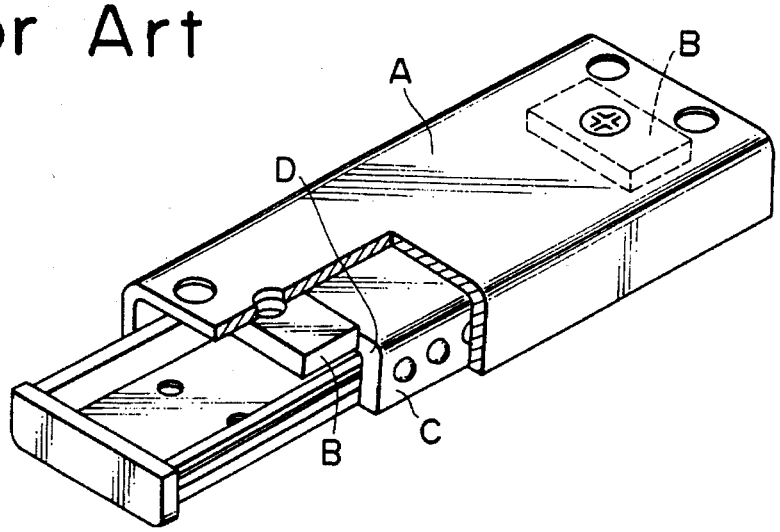
FIG. 4 is a schematic illustration showing in perspective view a prior art typical linear motion guide unit to which the present invention may be applied.

Referring now to FIG. 3, there is schematically shown in bottom view a stock retainer member 11 from which the retainer 4 of the present invention may be fabricated simply cutting the stock member to a desired length J. As shown in FIG. 3, the stock retainer member 11 has a generally U-shaped cross section and thus it includes a horizontal section 12 and a pair of vertical sections 13 and 14 extending vertically from the opposite sides of the horizontal section 12. The horizonal section 12 is formed with a plurality of windows 15 and 16 (one for each in the illustrated embodiment). Importantly, these windows 15 and 16 have an identical end shape at each end, which is also identical in shape to each of the recessed portions 9 and 10 of the retainer 4. In the embodiment shown in FIG. 3, the window 15 has a pair of end peripheries 17 and 18 which are identical in shape with a pair of end peripheries 19 and 20 of the other window 16, but the distance between the end peripheries 17 and 18 of the window 15 differs from the distance between the end peripheries 19 and 20 of the window 16. It is to be noted that these end peripheries 17–20 are also same in shape with other end peripheries 21 and 22 of the stock retainer member 11. When the stock retainer member 11 is cut to a desired length J, the end peripheries 19 and 21 define the recessed portions 9 and 10, respectively, in the retainer 4.

Each of the vertical sections 13 and 14 of the stock retainer member 11 is formed with a plurality of holes 23 as spaced apart from one another and arranged in a line in parallel with the longitudinal axis O—O of the stock retainer member 11. Each of these holes 23 has a diameter which is large enough to receive therein a corresponding ball 2.

Also provided in the present linear motion guide unit is a pair of end blocks 24 and 25 which are fixedly provided at the opposite ends of the slider 1.

As described above, in accordance with the present invention, since the effective stroke of the retainer 4 is increased by twice the depth H of the recessed portion 9, 10, an increased relative motion can be provided between the rail 3 and the slider 1. Alternatively, if the effective stroke were maintained constant, then the length of the slider or table 1 can be shortened by an amount equal to 2 H, so that the linear motion guide unit can be made much smaller in size, in particular in length. Moreover, if one or more windows is provided in the retainer 4, the weight of the retainer 4 and thus the total weight of the linear motion guide unit can be reduced. In addition, when the windows are provided to have an identical end shape, a retainer having a desired length can be produced with extreme ease. Thus, there can be provided a retainer and/or a linear motion guide unit with ease and at low cost.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. In combination, a linear motion guide unit which unit includes a rail, a slider, a plurality of rolling members interposed between said rail and said slider and a retainer for the rolling members comprising an elongated body having a pair of opposite ends, each of which is formed with an open recessed portion which is engageable with a stopper provided at each end of said guide unit, said retainer being formed from a stock retainer member comprising an elongated horizontal section and a pair of vertical sections extending vertically from opposite sides of said horizontal section, thereby defining a substantially U-shaped cross section, said horizontal section of said stock retainer member being non-symmetrical end-to-end and formed with a plurality of enclosed generally rectangular windows, each generally rectangular window having substantially identical end shapes, wherein the distance between the end peripheries of one generally rectangular window differs from the distance between the end peripheries of an immediately adjacent generally rectangular window along the longitudinal axis of the horizontal section and wherein one of said end shapes of one generally rectangular window forms one of said recessed portions of said retainer and one of said end shapes of another generally rectangular window forms the other of said recessed portions of said retainer and wherein the stock retainer member is cutable transversely of at least one of said windows between the end peripheries thereof to provide a retainer of a desired length and to define said recessed portions.

2. The combination of claim 1 in which said stoppers are mounted on said slider.

3. The combination of claim 1 wherein said retainer includes a single central enclosed generally rectangular window and wherein the open recessed portions are non-equidistant from respective ones of the end peripheries of the single central enclosed generally rectangular window.

4. The combination of claim 1 wherein said retainer includes two central enclosed generally rectangular windows, each having a different length along the longitudinal axis of the retainer, and wherein the open recessed portions are non-equidistant from adjacent ones of said two central enclosed generally rectangular windows.

* * * * *